US006046456A

United States Patent [19]

Bills

[11] Patent Number: 6,046,456

[45] Date of Patent: Apr. 4, 2000

[54] MINIATURE IONIZATION GAUGE UTILIZING MULTIPLE ION COLLECTORS

[75] Inventor: Daniel Granville Bills, Boulder, Colo.

[73] Assignee: Helix Technology Corporation, Mansfield, Mass.

[21] Appl. No.: 09/276,985

[22] Filed: Mar. 26, 1999

Related U.S. Application Data

[63] Continuation of application No. 08/917,932, Aug. 27, 1997.

[51] Int. Cl.[7] .................................................. G01L 21/32

[52] U.S. Cl. .......................... 250/397; 324/459; 324/462; 313/363.1

[58] Field of Search .................................. 250/397, 427; 324/459, 462; 313/7, 230, 264, 363.1

[56] References Cited

U.S. PATENT DOCUMENTS

| | | | |
|---|---|---|---|
| 3,353,048 | 11/1967 | Hagenlocher et al. | 313/7 |
| 3,760,212 | 9/1973 | Mennenga | 324/462 |
| 4,307,323 | 12/1981 | Bills et al. | 324/462 |
| 4,636,680 | 1/1987 | Bills et al. | 313/7 |
| 5,128,617 | 7/1992 | Bills | 324/459 |
| 5,250,906 | 10/1993 | Bills et al. | 324/462 |
| 5,296,817 | 3/1994 | Bills et al. | 324/460 |
| 5,422,573 | 6/1995 | Bills et al. | 324/460 |

OTHER PUBLICATIONS

Arnold, P.C. et al., "Nonstable behavior of widely used ionization gauges," J. Vac. Sci. Technol. A12, 568 (1994), pp. 568–573.

D.G. Bills, "Causes of nonstability and nonreproducibility in widely used Bayard–Alpert ionization gauges," J. Vac. Sci. Technol. A12, 574 (1994), pp. 574–579.

Arnold, P.C., et al., "Stable and reproducible Bayard–Alpert ionization gauge," J. Vac. Sci. Technol. A12, 580 (1994), pp. 580–586.

Granville–Phillips series 360 Product Data, "STABIL–ION® Vacuum Measurement System," Nov. 1996.

Anelva Miniature Gauge Data Sheet.

Redhead, P.A., "Modulated Bayard–Alpert Gauge," Rev. of Sci. Inst. (1960), pp. 343–344.

*Primary Examiner*—Kiet T. Nguyen
*Attorney, Agent, or Firm*—Hamilton, Brook, Smith & Reynolds, P.C.

[57] ABSTRACT

An ionization gauge including a source of electrons; an open anode defining an anode volume, where the source of electrons is disposed outside the anode volume; a plurality of ion collector electrodes disposed within the anode volume; a plurality of axially extending anode support posts for supporting the open anode, the anode support posts being electrically connected to the open anode; and the plurality of ion collector electrodes being respectively located sufficiently close to the plurality of axially extending anode support posts so as to substantially repel the electrons from the anode support posts.

1 Claim, 7 Drawing Sheets

MINIATURE IONIZATION GAUGE UTILIZING MULTIPLE ION COLLECTORS

This application is a continuation of Ser. No. 08/917,932 filed Aug. 27, 1997 now pending.

FIELD OF INVENTION

The present invention relates to an improved miniature ionization gauge utilizing multiple ion collectors.

BACKGROUND AND SUMMARY OF THE INVENTION

The rapidly increasing complexity of vacuum processing and the prohibitive cost of clean room facilities, particularly in the semiconductor industry, has produced an unmet and growing need for miniature ionization gauges with good accuracy and stability.

In U.S. Pat. Nos. 5,128,617; 5,250,906; 5,296,817; and 5,422,573 (all of which patents are assigned to the assignee of the present application and hereby incorporated herein by reference) and in J. Vac. Sci. Technol. A12, 568 (1994); J. Vac. Sci. Technol. A12, 574 (1994); and J. Vac. Sci. Technol. A12, 580 (1994), new gauges are described which improve the accuracy and long term stability of ionization gauges by at least a factor of ten compared to prior art ionization gauges. These new gauges, trademarked STABIL-ION® Gauges by the assignee of the present application and hereafter referred to as STABIL-ION gauges, are well suited for their intended purpose and are of comparable size to the relatively large prior art, glass enclosed Bayard-Alpert (BA) type ionization gauges they replace.

Miniature glass enclosed BA ionization gauges are known but suffer from all of the problems with prior art ionization gauges. These problems are described in full detail in above-referenced U.S. Pat. Nos. 5,128,617; 5,250,906; 5,296,817; and 5,422,573. In addition to these problems, these miniature glass enclosed BA gauges suffer from very low sensitivity and relatively high lower pressure limits.

Miniature metal enclosed BA gauges are also known which eliminate the well-known problems with glass enclosures. However, inside the metal enclosure the electrode geometry is essentially the same as prior art BA gauges. These all metal prior art miniature gauges also suffer from very low sensitivity and relatively high lower pressure limits.

When Bayard-Alpert ion gauge electrode geometry is decreased in size much below the standard dimensions originally used by Bayard and Alpert, gauge sensitivity is decreased markedly, accuracy and long term stability are significantly reduced and the so-called X-ray effect increases. When STABIL-ION gauge geometries are miniaturized, there is some deterioration of performance for the following reasons. To obtain relatively high sensitivity the electron path lengths must be long. To obtain long electron path lengths with small grid diameter requires high grid transparency. High grid transparency requires small diameter grid wires relative to the grid wire spacing. The grid wire spacing must be maintained small compared to the cathode to grid spacing to prevent space charge saturation of electron emission at the cathode. The cathode to grid spacing must be small to achieve small overall gauge size. Thus, it can be understood that the grid wires must be of small diameter, say, 0.002 in. in a miniaturized STABIL-ION® design, and thus are not self-supporting as in conventional glass BA gauges. Thus, axially extending grid supports must be used to support the small diameter grid wires to assure stable geometry. It is these relatively large diameter grid supports that cause difficulties in miniaturizing the STABIL-ION design. The grid wires are cylindrically symmetrical and thus do not intercept the electron stream preferentially. However, the axially extending grid supports located at multiple locations around the grid intercept the electron stream asymmetrically and cause stability problems as described below.

The fact that the grid posts intercept the electron stream asymmetrically would not be a problem if the electron stream could always be maintained in the same location across the grid volume. However, minute and, therefore, unavoidable changes in electrode geometry and in location of electron origins on the cathode can change the stream of electron trajectories significantly. Thus, when a given gauge is calibrated with the then existing electron trajectories, it remains accurate only so long as the electron trajectories through the grid volume do not change significantly. If the trajectories shift for any reason, then a fraction of the stream of electrons may impinge on a grid support causing a decrease in sensitivity or conversely, electrons trajectories which previously had been impinging on a grid support may shift and avoid the grid support, resulting in an increase in path length and, therefore, an increase in sensitivity. These shifts in electron trajectories cause inaccuracies in gauge indication with the root cause being the asymmetrically placed grid supports. Although these problems occur in the full-sized STABIL-ION Gauge design to a slight extent, the undesired effects become larger as the anode diameter is decreased. Thus, merely miniaturizing prior art geometries does not produce acceptable results.

If the STABIL-ION electrode geometry is decreased in size much below the standard intended dimensions listed in U.S. Pat No. 5,128,617 another undesired effect is observed. The STABIL-ION design requires that the electron stream initially be aimed at an imaginary axis which is parallel to the axial ion collector but displaced radially from the ion collector as shown in FIG. 1 of U.S. Pat. No. 5,128,617.

Thus, when a small anode diameter is used, it is not possible to achieve long path lengths because the electron stream does not remain concentrated in a beam but is spread out as soon as the beam nears the extreme curvature of the small anode. Thus, it is very difficult to keep the electron stream from intersecting the grid posts in a miniature STABIL-ION design.

Prior art miniature ionization gauges are not able to measure very low pressures because of the so-called X-ray effect. Soft X-rays generated by electron impact on the grid cause electron ejection at the ion collector. This X-ray caused current is not pressure dependent and thus sets a lower limit on the pressure dependent ion collector current which is measured. Because the gauge sensitivity is reduced because of the small geometry, the X-ray effect is increased and the lowest measurable pressure is increased in prior art miniature ionization gauges.

It is well-known that the ion collector electrode exerts a repelling force on electrons depending on the distance of approach to the ion collector electrode. Thus, any slight shift in the trajectory of an electron relative to the ion collector electrode grows rapidly with time as the electron oscillates back and forth through the grid volume. In BA type gauges with a single ion collector this effect causes changes in how the electron stream interacts with the anode supports, thus leading to non-stable behavior. However, in accordance with the present invention, the repelling effects of the ion collector on electron trajectories inside the ion collection volume can be turned to advantage by utilizing the ion collector to repel electrons from the vicinity of an anode support.

Applicant has discovered that the problems described above can be avoided and that the total path length of electrons inside the anode volume can be greatly increased by locating an ion collector electrode parallel to and closely adjacent to each anode support posts. The multiple ion collector electrodes effectively repel electrons approaching the anode support posts and thus prevent premature collection of electrons on the posts. Thus, the electron path length is significantly increased in the present invention compared to that in prior art gauges of the same size. Increasing the path length of electrons inside the anode volume is highly desirable because increasing this portion of the path length increases the rate of ions created and, therefore, increases the gauge sensitivity proportionately.

In U.S. Pat. No. 3,353,048 the use of multiple ion collector electrodes is disclosed. The conventional single ion collector electrode, typically located on the axis of the grid, has been moved off center and duplicated for symmetry in this prior art device to provide space for a beam of molecules along the axis of the grid. However, the ion collector electrodes in U.S. Pat. No. 3,353,048 are not located adjacent to the anode support posts as in the present invention and, therefore, do not perform the essential functions required in the present invention of preventing premature electron collection.

In the article entitled "Modulated Bayard-Alpert Gauge", P. A. Redhead, Rev. of Sci. Inst., 1960, pp. 343–344, there is described a modulator gauge, this gauge being a Bayard-Alpert type gauge with a second electrode located in the grid volume. One of these electrodes is a conventional ion collector electrode disposed along the central axis of the grid volume and typically biased at ground potential. The other electrode is a so-called modulator electrode consisting of a small diameter wire located parallel to the ion collector electrode. In use, the potential of the modulator electrode is switched from grid to ground potential. When the modulator electrode is at said potential, there is zero ion current to the modulator. When the modulator is at ground potential, a relatively large fraction of the ions within the grid volume are attracted to the modulator electrode, thus decreasing the ion collector current by 30 to 40%. The residual current to the ion collector electrode remains essentially constant as the modulator potential is switched. Thus, measurements with the modulator permit the residual current to be calculated separately from the true ion current. This gauge is referenced simply because of the second electrode being within the grid volume, the gauge, in fact, being unrelated to the present invention.

BRIEF DESCRIPTION OF THE DRAWING

FIGS. 3*a* and 3*b* show the trajectories in prior art electrode configurations while FIGS. 3*c* through 3*e* illustrate trajectories in accordance with different illustrative electrodes configurations in accordance with the present invention.

DETAILED DESCRIPTION OF THE INVENTION

Figure 1A:
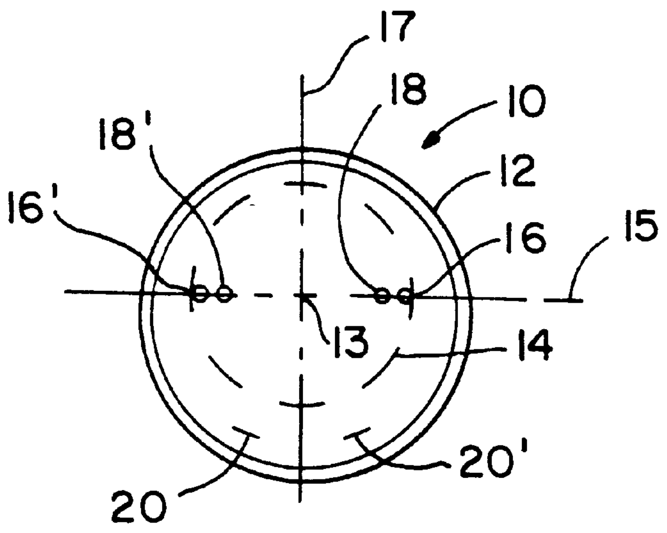
FIGS. 1*a* and 1*b* are cross-sectional plan and elevation views respectively of an illustrative ionization gauge in accordance with the present invention.

Reference is made to the drawings where like reference numerals refer to like parts.

Referring to FIG. 1*a*, there is shown a cross-sectional view at the midpoint of the axis of an illustrative gauge 10 in accordance with the invention. The gauge includes an envelope 12 which is preferably an electrically conductive, outer electrode but which may be a glass envelope. Disposed within the envelope is a grid or anode 14. The envelope 12 is preferably cylindrically symmetric. The anode 14 is preferably circular in cross section about an axis 13 but other shapes, for example, elliptical may be used. The anode is preferably an open grid of high transparency as indicated by the dashed lines in FIG. 1*a*. Anode support posts 16 and 16' are preferably located on a diameter of the circular anode. Dual ion collector electrodes 18 and 18' are located adjacent to the support posts 16 and 16' and preferably parallel to the axis 13 of the anode 14 where the ion collectors and preferably the anode support posts are located on a common plane 15 passing through axis 13 indicated in FIG. 1*a*. One or two axially extending cathodes 20 and 20' are disposed in the space between the anode 14 and the envelope 12 where the cathodes may be symmetrically disposed about an orthogonal plane 17 which is perpendicular to plane 15. Alternatively, one cathode may be utilized and disposed adjacent to plane 17 at only one side thereof as indicated in FIGS. 3*e*–3*c* described hereinafter.

Figure 1B:
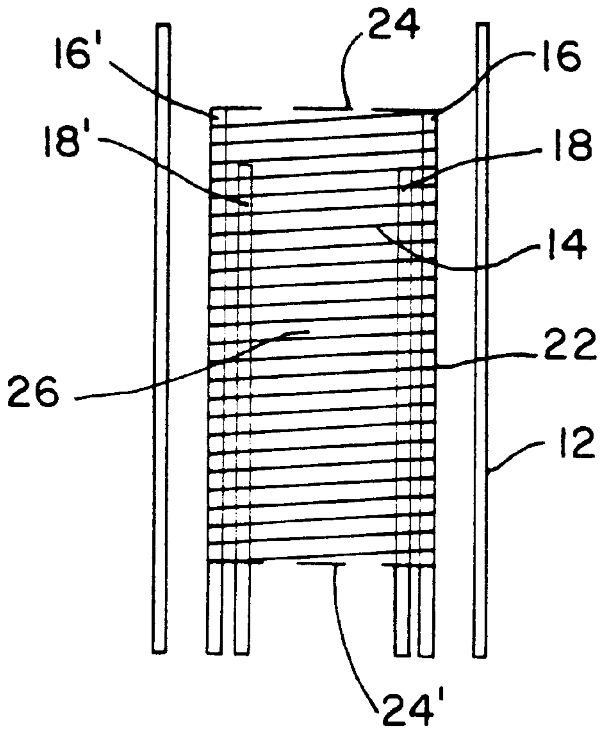

Referring to FIG. 1*b*, there is shown a cross-sectional view through the diameter of the anode 14 on which the anode support posts are located. The anode preferably comprises a helically wound grid wire attached to the anode supports 16 and 16'. A typical attachment point is shown at 22. Anode end plates 24 and 24' may be provided covering each end of the anode to help define an ion collection volume 26 which is electrostatically isolated from the surroundings. The anode end plates 24 and 24' are grids having high transparency similar to that of the anode 14.

Figure 2:
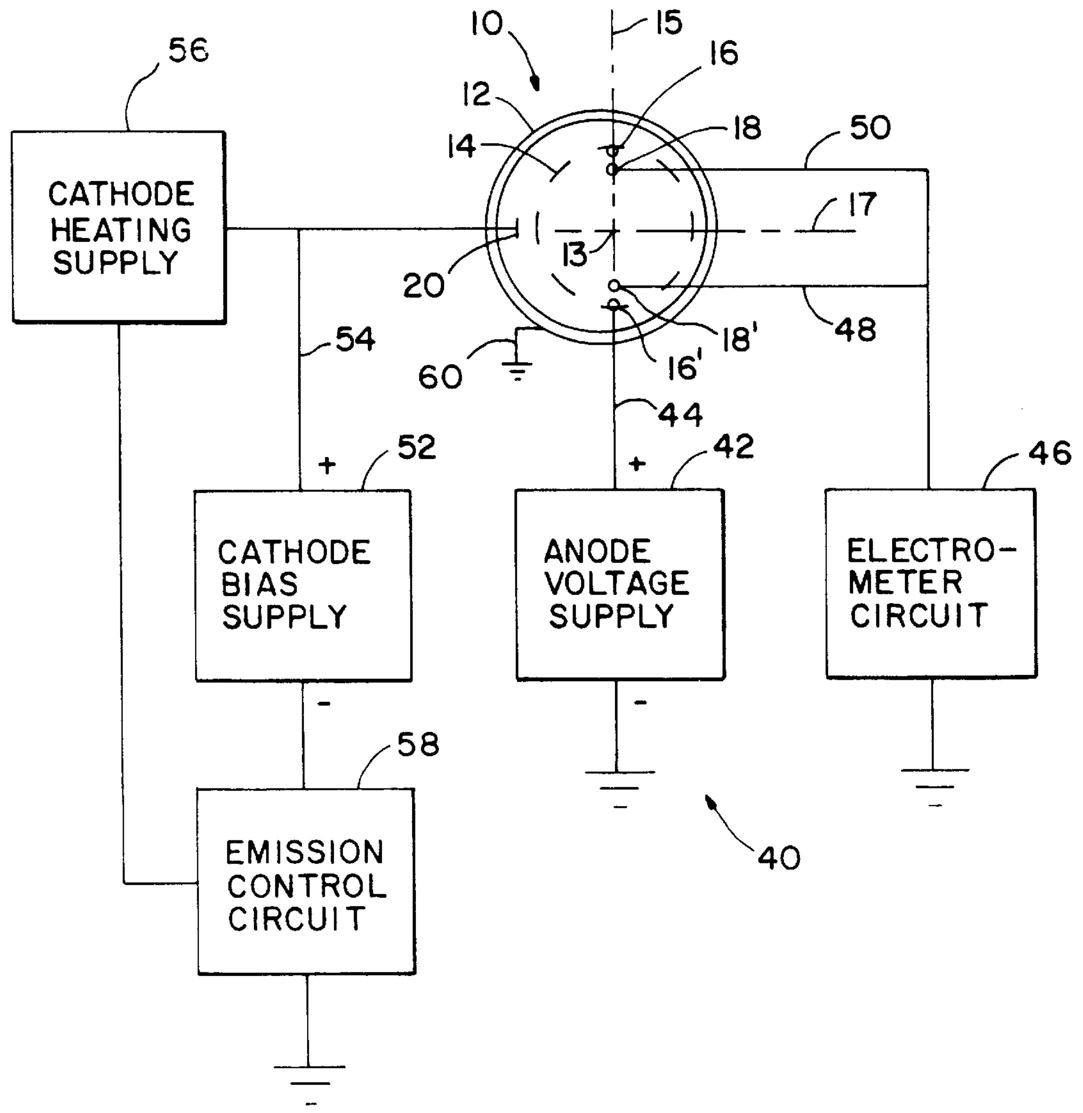
FIG. 2 is a schematic/block diagram of illustrative controller circuitry for use with the invention.

Referring to FIG. 2, controller circuitry 40 includes the circuit elements for providing preferred potentials to the electrodes of gauge 10, for measuring the ion current, and for providing the other electric currents and voltages needed for operation of the gauge. In particular, controller 40 includes an anode voltage supply 42 connected to anode 14 via line 44, an electrometer circuit 46 connected to the ion collectors 18, via lines 48 and 50, and a cathode bias supply 52 connected to axially extending cathode 20 via line 54. A cathode heating supply 56 for providing a heating current, preferably DC, to the cathode and an emission control circuit 58 are also preferably provided. Moreover, outer electrode 12 is preferably grounded as indicated at 60.

The cathode is preferably biased at local potential or just slightly positive with respect to local potential in the vicinity of the cathode. See U.S. Pat. No. 5,128,617, col. 5, lines 40–48, for a discussion of local potential. Moreover, note in this configuration the cathode is disposed on the plane 17.

The potential difference between the anode and cathode must be sufficiently high to provide appropriate ionizing energy for electrons. The electric field in front of the cathode must be sufficiently high to prevent space charge limitation of emission. The ion collector electrode is preferably biased at ground potential, all of which is well-known in the art. For example, the envelope 12 and ion collector 18 may be grounded while the cathode 20 and anode 14 may have bias voltages of 30 and 180 volts respectively applied thereto.

Figure 3A:
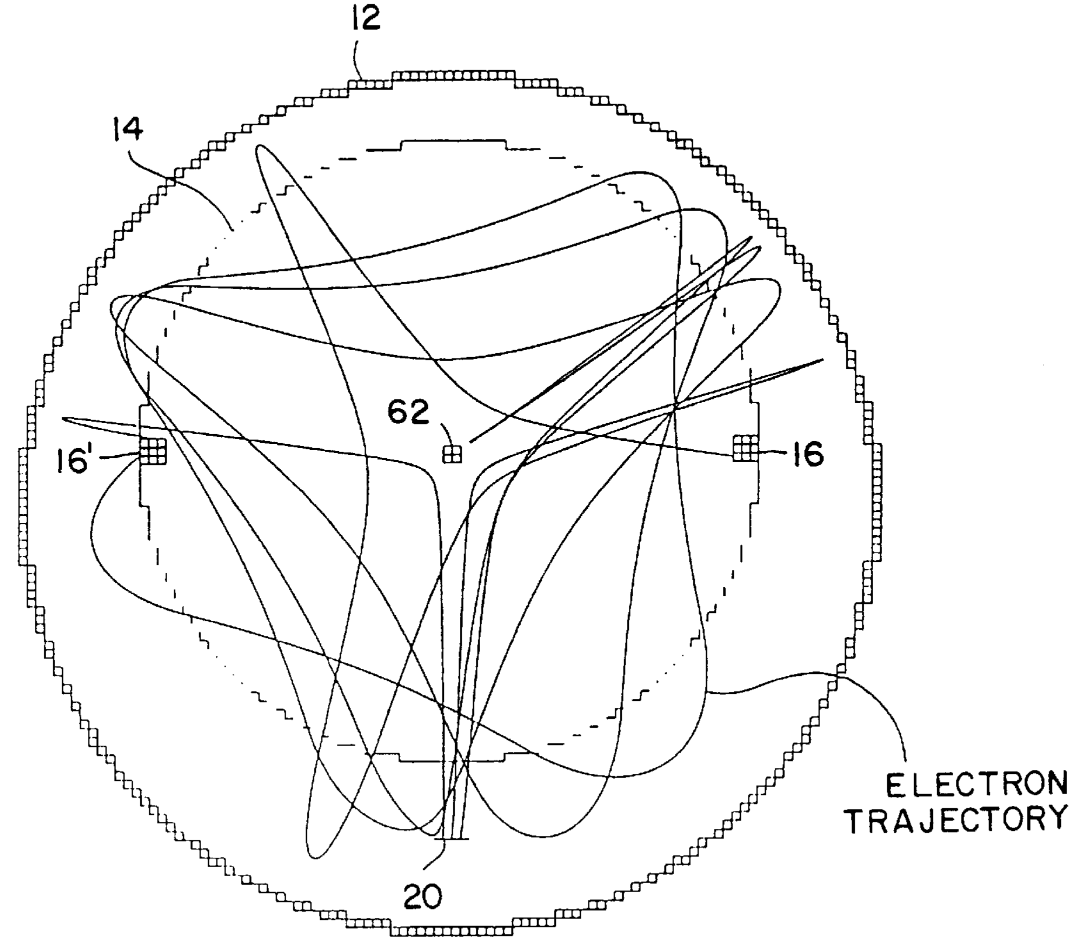
FIG.3A PRIOR ART
FIGS. 3*a* through 3*e* are computer simulations of the trajectories of three typical electrons emitted from the hot cathode in different electrode geometries where
Figure 3B:
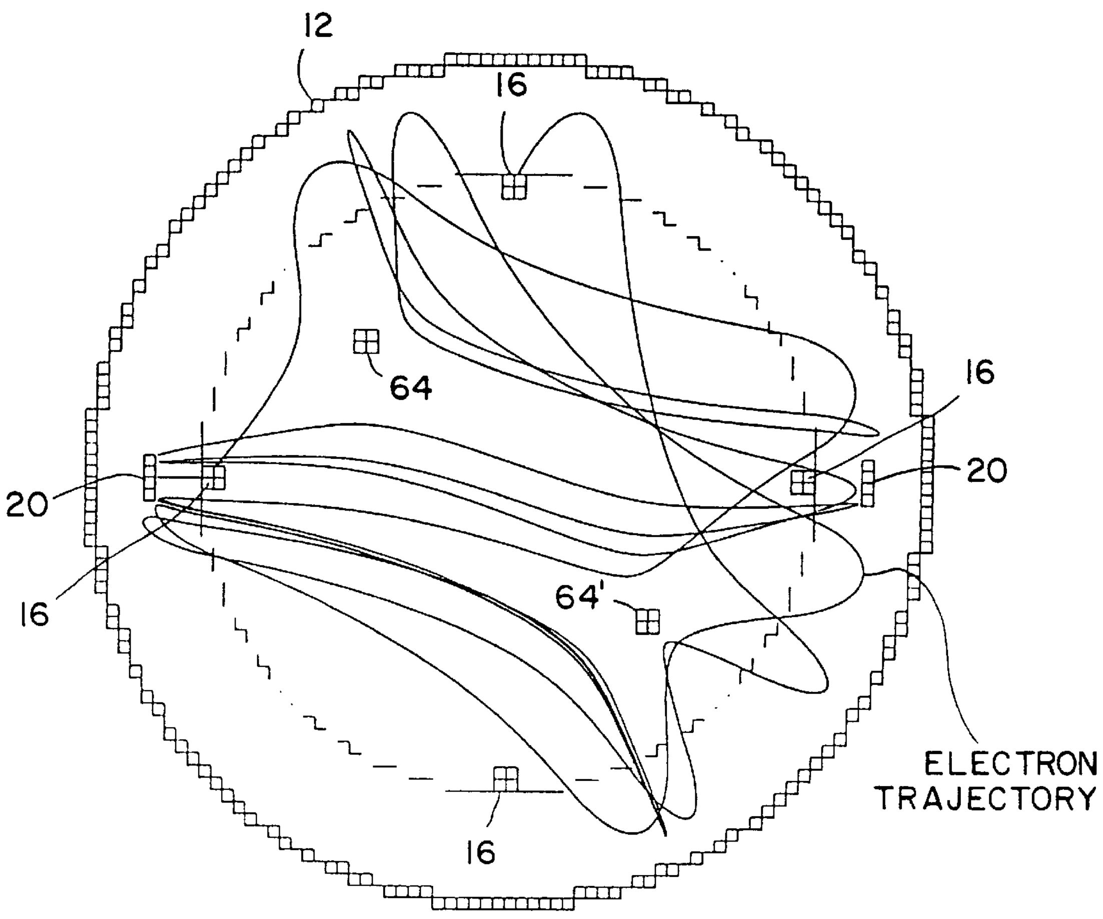
FIG.3B PRIOR ART
Figure 3C:
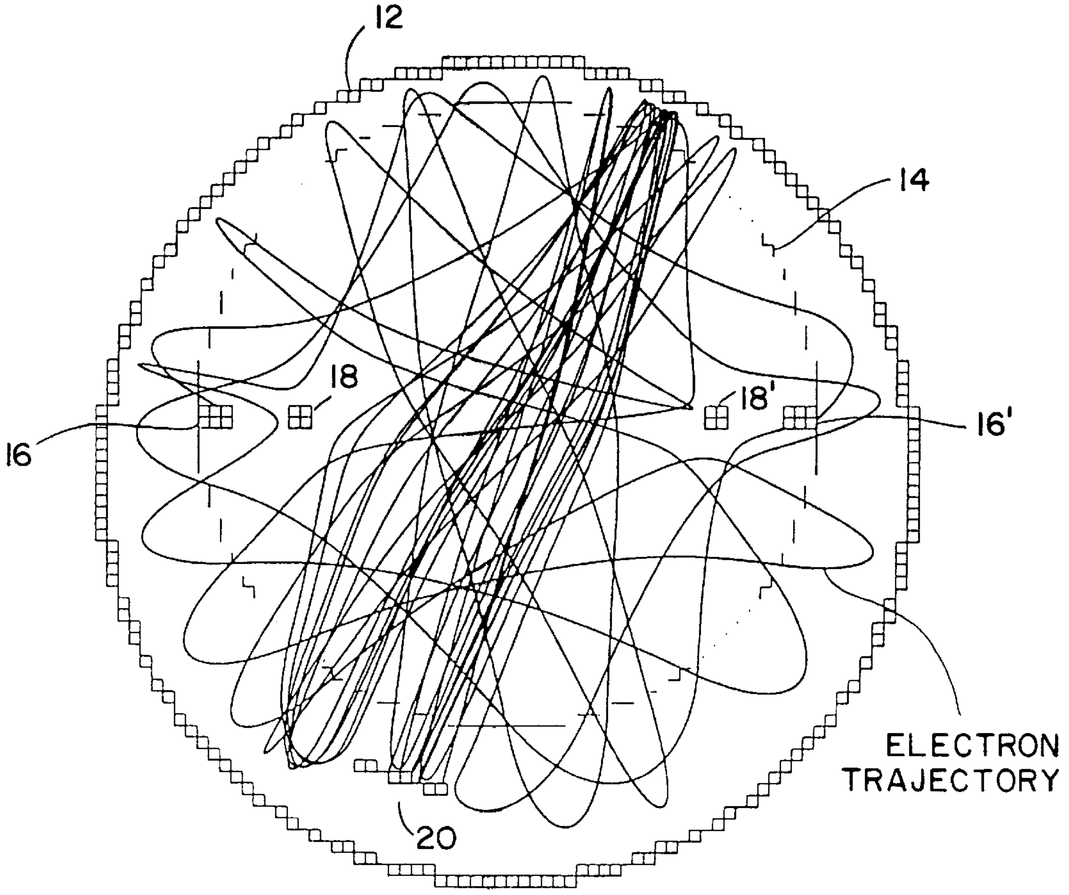
Figure 3D:
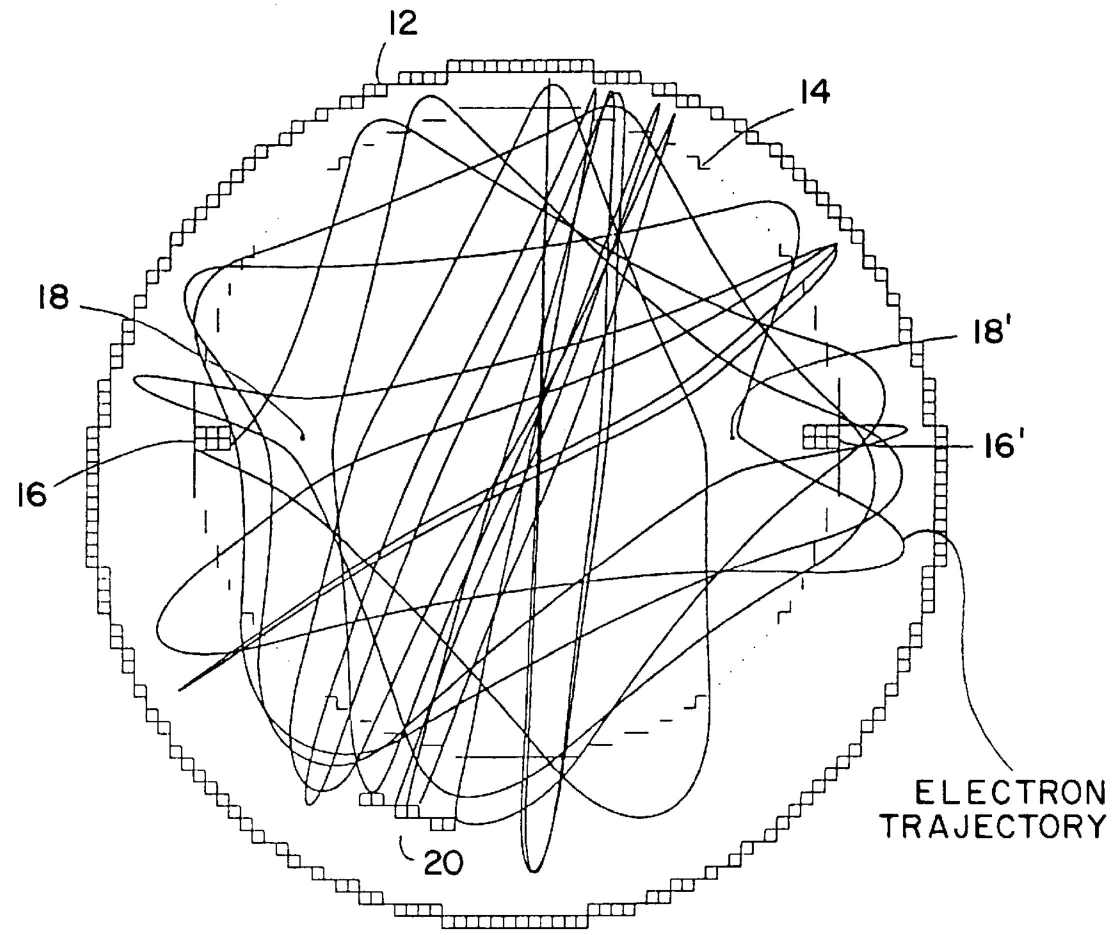
Figure 3E:
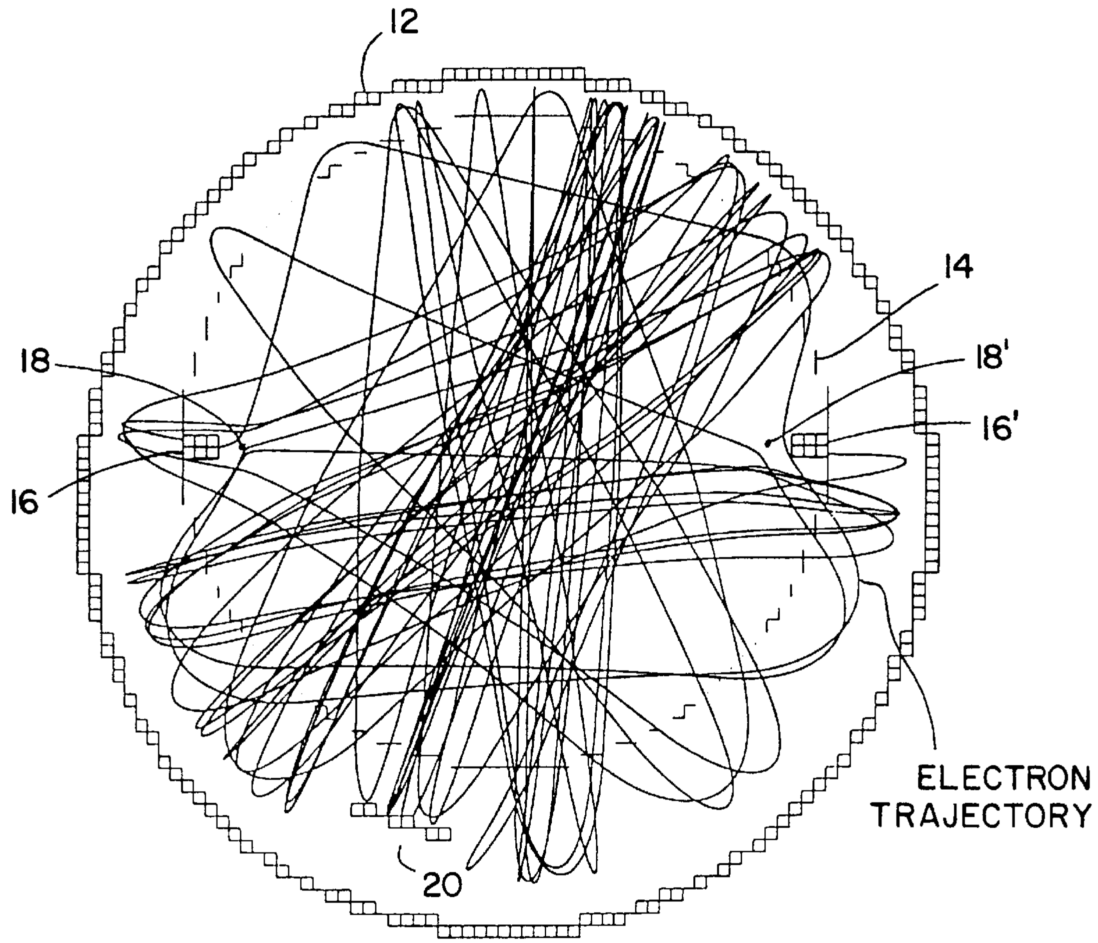

FIGS. 3*a* through 3*e* are computer simulations of the trajectories of three typical electrons emitted from the hot cathode in different electrode geometries where FIGS. 3*a* and 3*b* show the trajectories in prior art electrode configurations while FIGS. 3*c* through 3*e* illustrate trajectories in accordance with different illustrative electrodes configurations in accordance with the present invention.

FIG. 3*a* shows trajectories in a prior art Bayard Alpert ionization gauge with a single ion collector electrode 62 centered in the volume defined by anode 14. FIG. 3*b* shows the trajectories in the electrode configuration disclosed in U.S. Pat. No. 3,353,048, referenced hereinbefore, wherein the ion collector electrodes 64 and 64' are substantially spaced from the anode support posts 16.

FIG. 3*c* shows the trajectories in an electrode configuration used in the present invention. It is apparent that the total path length of the electrons in the anode volume in the new configuration of FIG. 3*c* is significantly larger than in either of the prior art configurations illustrated in FIGS. 3*a* and 3*b*. Because the gauge sensitivity is proportional to the total electron path length inside the ion collection volume which corresponds roughly to the anode volume, the gauge sensitivity is significantly higher in the present invention as illustrated in FIG. 3*c* compared to prior art geometries illustrated in FIGS. 3*a* and 3*b*.

In FIG. 3*d* the electrode configuration is exactly the same as in FIG. 3*c* except that the diameter of ion collector electrodes 18 and 18' is significantly smaller than in FIG. 3*c*. It is apparent that the total electron path length is significantly smaller in the configuration of FIG. 3*d* than in FIG. 3*c*. In FIG. 3*e* the electrode configuration is exactly the same as in FIG. 3*d* except that the spacing between the ion collector electrodes 18 and 18' and the anode support posts 16 and 16' is significantly smaller. It is readily apparent from these computer simulations that even relatively small diameter ion collectors located closely adjacent to the anode support posts significantly reduces the premature collection of electrons on the anode support posts.

In general, the diameter of the ion collectors should preferably be not less than 0.001 inch and not more than 0.08 inch. Furthermore, the distance between each anode support post and its associated ion collector should not be more than 30% and preferably not more than 5% of the radius of the anode assuming an anode of cylindrical configuration is employed. Moreover, the distance between each anode support post and its associated ion collector should preferably be not less than 0.010 inch and not more than 0.1 inch.

Furthermore, it should be understood that, although the invention has been described with respect to miniature gauges (diameter of anode volume typically about ⅜ to ½ inch), it is also applicable to gauges of conventional size (diameter of anode volume typically about one inch).

What is claimed is:

1. An ionization gauge comprising:

a source of electrons;

an open anode defining an anode volume, where said source of electrons is disposed outside said anode volume, a plurality of ion collector electrodes disposed within said anode volume, a plurality of axially extending anode support posts for supporting said open anode, said anode support posts being electrically connected to the open anode, wherein, said plurality of ion collector electrodes are respectively located sufficiently close to said plurality of axially extending anode support posts so as to substantially repel said electrons from said anode support posts.

* * * * *

UNITED STATES PATENT AND TRADEMARK OFFICE

CERTIFICATE OF CORRECTION

PATENT NO. : 6,046,456

DATED : April 4, 2000

INVENTOR(S) : Daniel G. Bills

It is certified that error appears in the above-identified patent and that said Letters Patent is hereby corrected as shown below:

Column 6, add the following claims:

An ionization gauge as in claim 1 where said plurality of ion collector electrodes are respectively substantially parallel to said anode support posts.

An ionization gauge as in claim 1 wherein the number of said anode support posts is at least two and the number of said ion collector electrodes is at least two.

An ionization gauge as in claim 3 where said two ion collector electrodes are disposed on a common plane.

An ionization gauge as in claim 4 wherein said source of electrons is located with respect to an orthogonal plane which is perpendicular to said common plane passing through said two ion collector electrodes and which is approximately midway between said two ion collector electrodes.

An ionization gauge as in claim 5 wherein said source of electrons comprises at least two adjacent, axially extending cathodes symmetrically disposed about said orthogonal plane.

An ionization gauge as in claim 5 wherein said source of electrons comprises at least one axially extending cathode disposed adjacent to said orthogonal plane at only one side thereof.

UNITED STATES PATENT AND TRADEMARK OFFICE

CERTIFICATE OF CORRECTION

PATENT NO. : 6,046,456

DATED : April 4, 2000

INVENTOR(S) : Daniel G. Bills

It is certified that error appears in the above-identified patent and that said Letters Patent is hereby corrected as shown below:

An ionization gauge as in claim 5 wherein said source of electrons comprises at least one axially extending cathode disposed substantially at said orthogonal plane.

An ionization gauge as in claim 1 wherein the distance between each said anode support post and its associated ion collector electrode is not less than 0.010 inch and not more than 0.1 inch.

An ionization gauge as in claim 1 where said open anode is cylindrical in configuration.

An ionization gauge as in claim 10 wherein the distance between each said anode support post and its associated ion collector electrode is not more than 30% of the radius of said anode.

An ionization gauge as in claim 11 wherein said distance is not more than 5% of the radius of said anode.

An ionization gauge as in claim 10 wherein the diameter of said anode is about 3/8 to 1/2 inch.

An ionization gauge as in claim 10 wherein the diameter of said open anode is about one inch.

UNITED STATES PATENT AND TRADEMARK OFFICE

CERTIFICATE OF CORRECTION

PATENT NO. : 6,046,456

DATED : April 4, 2000

INVENTOR(S) : Daniel G. Bills

It is certified that error appears in the above-identified patent and that said Letters Patent is hereby corrected as shown below:

An ionization gauge as in claim 1 wherein the diameter of said ion collector electrodes is not less than 0.001 inch and not more than 0.080 inch.

An ionization gauge as in claim 1 where said open anode comprises a helical grid structure.

An ionization gauge as in claim 1 including controller circuitry therefor for applying bias voltages to said source of electrons, said open anode, and said ion collector electrodes wherein the bias applied between said open anode and said source of electrons is sufficient to provide ionizing energy to said electrons and where the bias applied to the ion collector electrodes is substantially less than that applied to the open anode and anode support posts therefor so that said repelling of said electrons from said anode support posts is facilitated.

The ionization gauge of claim 1 wherein at least one of the anode support posts and its associated ion collector are located in a common plane passing through a central axis of the open anode.

UNITED STATES PATENT AND TRADEMARK OFFICE

CERTIFICATE OF CORRECTION

PATENT NO. : 6,046,456

DATED : April 4, 2000

INVENTOR(S) : Daniel G. Bills

It is certified that error appears in the above-identified patent and that said Letters Patent is hereby corrected as shown below:

The ionization gauge of claim 1 wherein the number of ion collector electrodes is at least as great as the number of anode support posts.

Signed and Sealed this

Eighteenth Day of July, 2000

Attest:

Q. TODD DICKINSON

*Attesting Officer*

*Director of Patents and Trademarks*

UNITED STATES PATENT AND TRADEMARK OFFICE

CERTIFICATE OF CORRECTION

PATENT NO. : 6,046,456

DATED : April 4, 2000

INVENTOR(S) : Daniel G. Bills

It is certified that error appears in the above-identified patent and that said Letters Patent is hereby corrected as shown below:

Column 6, add the following claims:

2. An ionization gauge as in claim 1 where said plurality of ion collector electrodes are respectively substantially parallel to said anode support posts.

3. An ionization gauge as in claim 1 wherein the number of said anode support posts is at least two and the number of said ion collector electrodes is at least two.

4. An ionization gauge as in claim 3 where said two ion collector electrodes are disposed on a common plane.

5. An ionization gauge as in claim 4 wherein said source of electrons is located with respect to an orthogonal plane which is perpendicular to said common plane passing through said two ion collector electrodes and which is approximately midway between said two ion collector electrodes.

6. An ionization gauge as in claim 5 wherein said source of electrons comprises at least two adjacent, axially extending cathodes symmetrically disposed about said orthogonal plane.

7. An ionization gauge as in claim 5 wherein said source of electrons comprises at least one axially extending cathode disposed adjacent to said orthogonal plane at only one side thereof.

UNITED STATES PATENT AND TRADEMARK OFFICE

CERTIFICATE OF CORRECTION

PATENT NO. : 6,046,456

DATED : April 4, 2000

INVENTOR(S) : Daniel G. Bills

It is certified that error appears in the above-identified patent and that said Letters Patent is hereby corrected as shown below:

8. An ionization gauge as in claim 5 wherein said source of electrons comprises at least one axially extending cathode disposed substantially at said orthogonal plane.

9. An ionization gauge as in claim 1 wherein the distance between each said anode support post and its associated ion collector electrode is not less than 0.010 inch and not more than 0.1 inch.

10. An ionization gauge as in claim 1 where said open anode is cylindrical in configuration.

11. An ionization gauge as in claim 10 wherein the distance between each said anode support post and its associated ion collector electrode is not more than 30% of the radius of said anode.

12. An ionization gauge as in claim 11 wherein said distance is not more than 5% of the radius of said anode.

13. An ionization gauge as in claim 10 wherein the diameter of said anode is about 3/8 to 1/2 inch.

14. An ionization gauge as in claim 10 wherein the diameter of said open anode is about one inch.

UNITED STATES PATENT AND TRADEMARK OFFICE
CERTIFICATE OF CORRECTION

PATENT NO. : 6,046,456
DATED : April 4, 2000
INVENTOR(S) : Dainel G. Bills

It is certified that error appears in the above-identified patent and that said Letters Patent is hereby corrected as shown below:

15. An ionization gauge as in claim 1 wherein the diameter of said ion collector electrodes is not less than 0.001 inch and not more than 0.080 inch.

16. An ionization gauge as in claim 1 where said open anode comprises a helical grid structure.

17. An ionization gauge as in claim 1 including controller circuitry therefor for applying bias voltages to said source of electrons, said open anode, and said ion collector electrodes wherein the bias applied between said open anode and said source of electrons is sufficient to provide ionizing energy to said electrons and where the bias applied to the ion collector electrodes is substantially less than that applied to the open anode and anode support posts therefor so that said repelling of said electrons from said anode support posts is facilitated.

UNITED STATES PATENT AND TRADEMARK OFFICE

CERTIFICATE OF CORRECTION

PATENT NO. : 6,046,456

DATED : April 4, 2000

INVENTOR(S) : Dainel G. Bills

It is certified that error appears in the above-identified patent and that said Letters Patent is hereby corrected as shown below:

18. The ionization gauge of claim 1 wherein at least one of the anode support posts and its associated ion collector are located in a common plane passing through a central axis of the open anode.

19. The ionization gauge of claim 1 wherein the number of ion collector electrodes is at least as great as the number of anode support posts.

This certificate supercedes certificate of correction issued July 18, 2000.

Signed and Sealed this

Tenth Day of October, 2000

Attest:

Q. TODD DICKINSON

*Attesting Officer*

*Director of Patents and Trademarks*